Nov. 26, 1935.  J. MORTENSEN  2,022,602
TROLLING LEAD
Filed Jan. 8, 1935
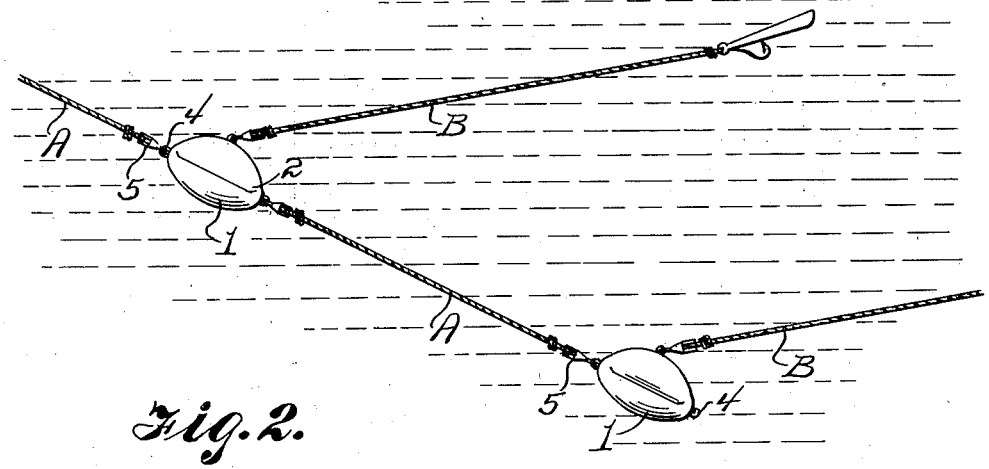
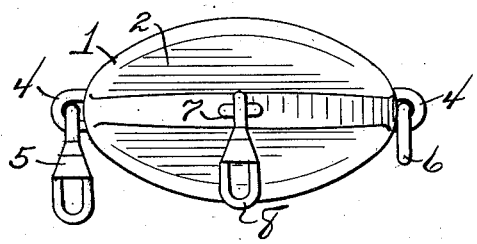
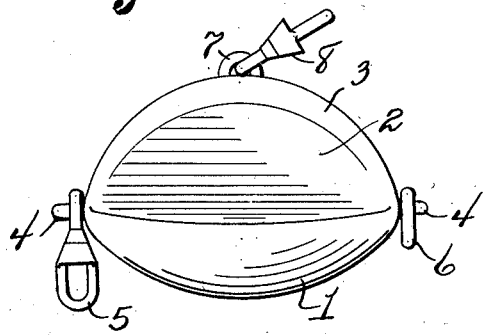
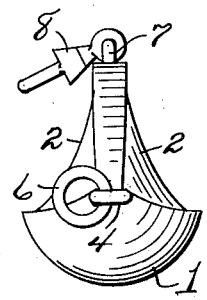
Jorgen Mortensen
INVENTOR
BY Victor J. Evans & Co.
ATTORNEY Patented Nov. 26, 1935

2,022,602

UNITED STATES PATENT OFFICE 2,022,602

TROLLING LEAD

Jorgen Mortensen, Sitka, Territory of Alaska

Application January 8, 1935, Serial No. 883

5 Claims. (Cl. 43—28)

This invention relates to fishing sinkers, and its general object is to provide a trolling lead that is primarily designed for salmon fishing, where a plurality of leads are used on a single line made up of sections, with a bait leader for each lead, and while much difficulty has been experienced with the oval leads now in general use, my leads will overcome the same, in that they include means for directly and swivelly connecting the leaders thereto, which renders spreaders unnecessary, and that feature coupled with the particular shape of my leads prevent the leaders from winding or twisting about the main line sections or fouling the latter when in use, nor can my leads roll when on deck.

A further object of the invention is to provide a trolling lead that can be replaced, if lost, in an easy and expeditious manner, is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a view illustrating my leads in use.

Figure 2 is a top plan view of one of my leads.

Figure 3 is a side view thereof.

Figure 4 is an end view.

Referring to the drawing in detail, it will be noted that my lead or sinker is of oval shape in outline, but the particular shape thereof causes the majority of the weight to be centered in one portion which is termed the bottom that is indicated by the reference numeral 1.

The bottom portion 1 is rounded, in that it is substantially semi-circular in cross section but decreases in width from its transverse center line, toward the ends thereof, as best shown in Figure 2.

The side portions 2 of the lead are materially reduced in concaved diverging relation with respect to each other, with the lower edges thereof merging into the upper edges of the bottom portion, while the upper edges of the concaved portions merge into vertical portions 3, the latter extending to the top to act in the capacity as a rudder.

The top portion is curved longitudinally to a greater degree than the longitudinal curvature of the bottom portion, and the ends of the top portion merge into the ends of the bottom portion, as clearly shown in Figure 3.

Secured in and extending from the opposite ends of the lead and preferably at the point of juncture of the top and bottom portions, are eye members 4, both of which may have connected therewith swivel members such as indicated by the numeral 5, but I prefer a swivel member 5 connected to one of the eye members and a ring 6 to the other eye member, as best shown in Figure 2.

Secured in and rising from the extreme upper end of the top portion 3 is an eye member 7 which as shown has connected thereto a swivel member 8 of the same construction as the swivel member 5.

My leads are primarily designed for use in trolling for salmon and other large fish and are arranged between each section of the main line, with a lead connected to the end of the end section, as shown in Figure 1. The main line sections are secured to the swivel members that are connected to the ends of the leads, or to a swivel member and ring, it depending upon whether a ring is used in place of a swivel member. When a ring is used, the lead is generally disposed so that the ring will be lowermost.

The sections of the main line are indicated for distinction by the letter A, and the leaders by the letter B. A leader is provided for each lead and they are secured to the swivel members 8. Any type of bait means is secured to the ends of the leaders, but I have illustrated spoons.

From the above description and disclosure of the drawing, it will be obvious that I have provided a lead that is shaped so that the center of gravity is confined within one portion thereof, therefore providing the bottom, while the remaining portions are shaped into a configuration in the form of a rudder, with the result that when the lead is in use, it has a tendency to remain upright. That feature coupled with the fact that the leaders B are swiveled to the leads will prevent the leaders from winding or twisting about the main line sections or fouling the latter, consequently the leaders will be disposed in proper position for use substantially at all times. Again, the particular shape of the leads prevents the same from rolling on the deck of a boat.

The application of the leaders directly to the leads render the use of spreaders unnecessary, and the leads can be replaced, if lost, in an easy and expeditious manner and in a great deal less time than the leads now in general use. This feature is of importance, as time is very valuable when fishing in a school of fish, because of the fact the school may disappear before a substantial number are caught.

It might be further stated that my lead, due to the shape thereof, sets up very little resistance and is also advantageous in that respect over leads now in general use.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A fishing lead comprising a weighted bottom portion, a rudder portion above the bottom portion, means for connecting line sections to the ends of the lead and means for connecting a leader to the rudder portion.

2. A fishing lead comprising a rounded weighted bottom portion, curved side walls merging into the bottom portion, a curved top portion having the side walls merging therein, means for connecting line sections to the ends of the lead and means for connecting a leader to the top portion.

3. A fishing lead comprising a curved weighted bottom portion, curved side walls merging into the bottom portion, a top portion having the curved side walls merging therein, said top portion having its ends merging into the ends of the bottom portion, means for connecting line sections to the point of juncture of the ends of the top portion with the bottom portion, and means for connecting a leader to the top portion.

4. A fishing lead comprising a weighted portion curved longitudinally and transversely, vertical side wall portions for the lead, concaved side wall portions having their lower edges merging into the bottom portion and their upper edges merging into the vertical side wall portions, a curved top cooperating with the vertical side portions to provide a rudder said top having its ends merging into the ends of the bottom portion, means for connecting line sections at the juncture of the ends of the top portion with the ends of the bottom portion, and means for connecting the leader to the top portion midway its ends.

5. A fishing lead comprising a weighted bottom curved longitudinally and transversely, a rudder portion above the bottom portion, an eye member extending from the ends of the bottom portion, means secured to the eye members for connecting line sections thereto, an eye member secured to and rising from the rudder portion, and swivel means for connecting a leader to the last mentioned eye member.

JORGEN MORTENSEN.